United States Patent
Tanigawa et al.

(10) Patent No.: US 10,070,356 B2
(45) Date of Patent: Sep. 4, 2018

(54) COMMUNICATION DEVICE, COMMUNICATION SYSTEM, COMMUNICATION CONTROL METHOD, AND COMMUNICATION CONTROL PROGRAM

(71) Applicant: KYOCERA Corporation, Kyoto-shi, Kyoto (JP)

(72) Inventors: Yoshiyuki Tanigawa, Machida (JP); Natsuhito Honda, Yokohama (JP); Qiuying Liu, Yokohama (JP); Motoaki Abe, Yokohama (JP); Yasuhiko Nishimura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/032,631

(22) PCT Filed: Oct. 29, 2014

(86) PCT No.: PCT/JP2014/078811
§ 371 (c)(1),
(2) Date: Apr. 28, 2016

(87) PCT Pub. No.: WO2015/064659
PCT Pub. Date: May 7, 2015

(65) Prior Publication Data
US 2016/0269958 A1 Sep. 15, 2016

(30) Foreign Application Priority Data
Oct. 30, 2013 (JP) ................................. 2013-225979

(51) Int. Cl.
*H04B 7/14* (2006.01)
*H04W 36/14* (2009.01)
(Continued)

(52) U.S. Cl.
CPC .............. *H04W 36/14* (2013.01); *H04B 7/15* (2013.01); *H04L 49/25* (2013.01); *H04W 36/06* (2013.01); *H04W 84/047* (2013.01); *H04W 88/10* (2013.01)

(58) Field of Classification Search
CPC ... H04W 36/06; H04W 36/14; H04W 84/047; H04W 88/10; H04B 7/15; H04L 49/25
See application file for complete search history.

(56) References Cited

U.S. PATENT DOCUMENTS 6,507,589 B1 * 1/2003 Ramasubramani ..... H04L 12/66
370/401
6,785,229 B1 * 8/2004 McNiff ................... H04L 12/66
370/230
(Continued)

FOREIGN PATENT DOCUMENTS

JP 2009-213108 A 9/2009
JP 2011-239272 A 11/2011
(Continued)

OTHER PUBLICATIONS

International Search Report in International Application No. PCT/JP2014/078811, dated Jan. 27, 2015.
(Continued)

*Primary Examiner* — Kevin Mew
(74) *Attorney, Agent, or Firm* — Hauptman Ham, LLP

(57) ABSTRACT

A communication device includes:
a first communication module configured to directly communicate with another device using first communication;
a second communication module configured to directly communicate with the another device using second communication that is different from the first communication in a standard;
(Continued)

a third communication module configured to connect to a public network and perform communication; and a controller configured to relay communication data with the public network to the another device, based on a request from the another device, using the first communication or the second communication, wherein the controller is configured to switch between the first communication and the second communication while maintaining a session with the public network performed by the third communication module.

6 Claims, 9 Drawing Sheets

(51) Int. Cl.
*H04W 36/06* (2009.01)
*H04B 7/15* (2006.01)
*H04L 12/947* (2013.01)
*H04W 84/04* (2009.01)
*H04W 88/10* (2009.01)

(56) References Cited

U.S. PATENT DOCUMENTS

| | | | | |
|---|---|---|---|---|
| 6,868,080 | B1* | 3/2005 | Umansky | H04L 12/5692 370/354 |
| 8,127,027 | B2* | 2/2012 | Niiya | H04L 65/105 709/203 |
| 8,400,983 | B2 | 3/2013 | Nakagawa et al. | |
| 9,009,327 | B2* | 4/2015 | Adhya | H04L 12/4641 370/338 |
| 2007/0291786 | A1* | 12/2007 | Maes | H04L 12/5692 370/465 |
| 2009/0086742 | A1* | 4/2009 | Ghai | H04W 36/14 370/401 |
| 2010/0008291 | A1* | 1/2010 | LeBlanc | H04L 45/24 370/328 |
| 2011/0149951 | A1* | 6/2011 | Qiu | H04L 12/66 370/352 |
| 2011/0294474 | A1* | 12/2011 | Barany | H04W 8/005 455/414.1 |
| 2012/0120914 | A1* | 5/2012 | Sedlacek | H04W 60/005 370/331 |
| 2012/0214494 | A1* | 8/2012 | Awoniyi | H04W 88/10 455/439 |
| 2013/0034220 | A1* | 2/2013 | Ozeri | H04M 15/06 379/142.06 |
| 2013/0083721 | A1* | 4/2013 | Wu | H04W 36/0055 370/315 |
| 2013/0150045 | A1* | 6/2013 | Das | H04W 36/14 455/436 |
| 2014/0036776 | A1* | 2/2014 | Al-Shalash | H04W 40/22 370/328 |
| 2014/0057643 | A1 | 2/2014 | Nawashiro | |
| 2014/0331135 | A1* | 11/2014 | Sukoff | H04L 65/60 715/719 |
| 2016/0204951 | A1* | 7/2016 | Walton | H04L 12/1475 370/259 |
| 2016/0226762 | A1* | 8/2016 | Zhang | H04L 49/25 |
| 2017/0223593 | A1* | 8/2017 | Koodli | H04W 36/14 |

FOREIGN PATENT DOCUMENTS

JP 2013-135240 A 7/2013
WO 2012/137908 A1 10/2012

OTHER PUBLICATIONS

Office Action in JP Application No. 2013-225979 dated Oct. 31, 2017, 3pp.

* cited by examiner

FIG.5

| Name | First ID | Second ID |
|---|---|---|
| End Machine | XXXXX1 | XXXXX2 |
| Note PC | YYYYY1 | - |
| AP at Home | - | ZZZZZ2 |
| ... | ... | ... |

19b

| Name | First ID | Second ID |
|---|---|---|
| Relay Machine | AAAAA1 | AAAAA2 |
| Headset | BBBBB1 | - |
| AP at Station | - | CCCCC2 |
| ... | ... | ... |

# COMMUNICATION DEVICE, COMMUNICATION SYSTEM, COMMUNICATION CONTROL METHOD, AND COMMUNICATION CONTROL PROGRAM

CROSS-REFERENCE TO RELATED APPLICATION

This application is a National Stage of PCT international application Ser. No. PCT/JP2014/078811 filed on Oct. 29, 2014 which designates the United States, incorporated herein by reference, and which is based upon and claims the benefit of priority from Japanese Patent Application No. 2013-225979 filed on Oct. 30, 2013, the entire contents of which are incorporated herein by reference.

FIELD

The present disclosure relates to a communication device, a communication system, a communication control method, and a communication control program. More particularly, the present disclosure relates to a communication device for relaying communication with a public network, a communication system, a communication control method, and a communication control program.

BACKGROUND

In recent years, many of communication devices such as smartphones support tethering. The tethering is a technology for relaying communication between another communication device and a public network using short-distance communication or the like. By using a communication device that supports tethering, a user can use another communication device that does not originally have a function for communicating with a public network by connecting it to the public network.

SUMMARY

A communication device according to an embodiment comprises: a first communication module configured to directly communicate with another device using first communication; a second communication module configured to directly communicate with the another device using second communication that is different from the first communication in a standard; a third communication module configured to connect to a public network and perform communication; and a controller configured to relay communication data with the public network to the another device, based on a request from the another device, using the first communication or the second communication, wherein the controller is configured to switch between the first communication and the second communication while maintaining a session with the public network performed by the third communication module.

A communication device according to another embodiment comprises: a fourth communication module configured to directly communicate with another device using first communication, the another device being configured to connect to a public network and perform communication; a fifth communication module configured to directly communicate with the another device using second communication that is different from the first communication in a standard; and a controller configured to relay communication data with the public network to the another device, based on a request of an own device, using the first communication or the second communication, wherein the controller is configured to switch between the first communication and the second communication while causing the another device to maintain a session with the public network.

A communication system according to still another embodiment comprises a relay machine configured to be communicable with a public network and an end machine configured to be communicable with the relay machine, wherein the relay machine includes: a first communication module configured to directly communicate with the end machine using first communication; a second communication module configured to directly communicate with the end machine using second communication that is different from the first communication in a standard; and a third communication module configured to connect to the public network and perform communication, and the end machine includes: a fourth communication module configured to directly communicate with the relay machine using the first communication; and a fifth communication module configured to directly communicate with the relay machine using the second communication, wherein the relay machine is configured to switch between the first communication and the second communication while maintaining a session with the public network performed by the third communication module when communication data with the public network based on a request from the end machine is relayed to the end machine using the first communication or the second communication.

A communication control method according to an embodiment implemented by a relay machine configured to be communicable with a public network and an end machine configured to be communicable with the relay machine, the communication control method comprises: relaying, by the relay machine, communication data with the public network based on a request from the end machine to the end machine using first communication or second communication that is different from the first communication in a standard; and switching, by the relay machine, between the first communication and the second communication while causing the relay machine to maintain a session with the public network.

A computer program product according to an embodiment having computer instructions, stored on a non-transitory computer readable storage medium, enables a computer of a communication device including: a first communication module configured to directly communicate with another device using first communication; a second communication module configured to directly communicate with the another device using second communication that is different from the first communication in a standard; and a third communication module configured to connect to a public network and perform communication, executing the computer instructions to perform operations comprising: relaying communication data with the public network based on a request from the another device to the another device using the first communication or the second communication; and switching between the first communication and the second communication while maintaining a session with the public network performed by the third communication module.

BRIEF DESCRIPTION OF DRAWINGS

FIG. 5 is a diagram illustrating an example of pairing information according to an embodiment of some embodiments.

DESCRIPTION OF EMBODIMENTS

A plurality of embodiments for implementing the present disclosure will be explained in detail below with reference to the accompanying drawings.

Figure 1:
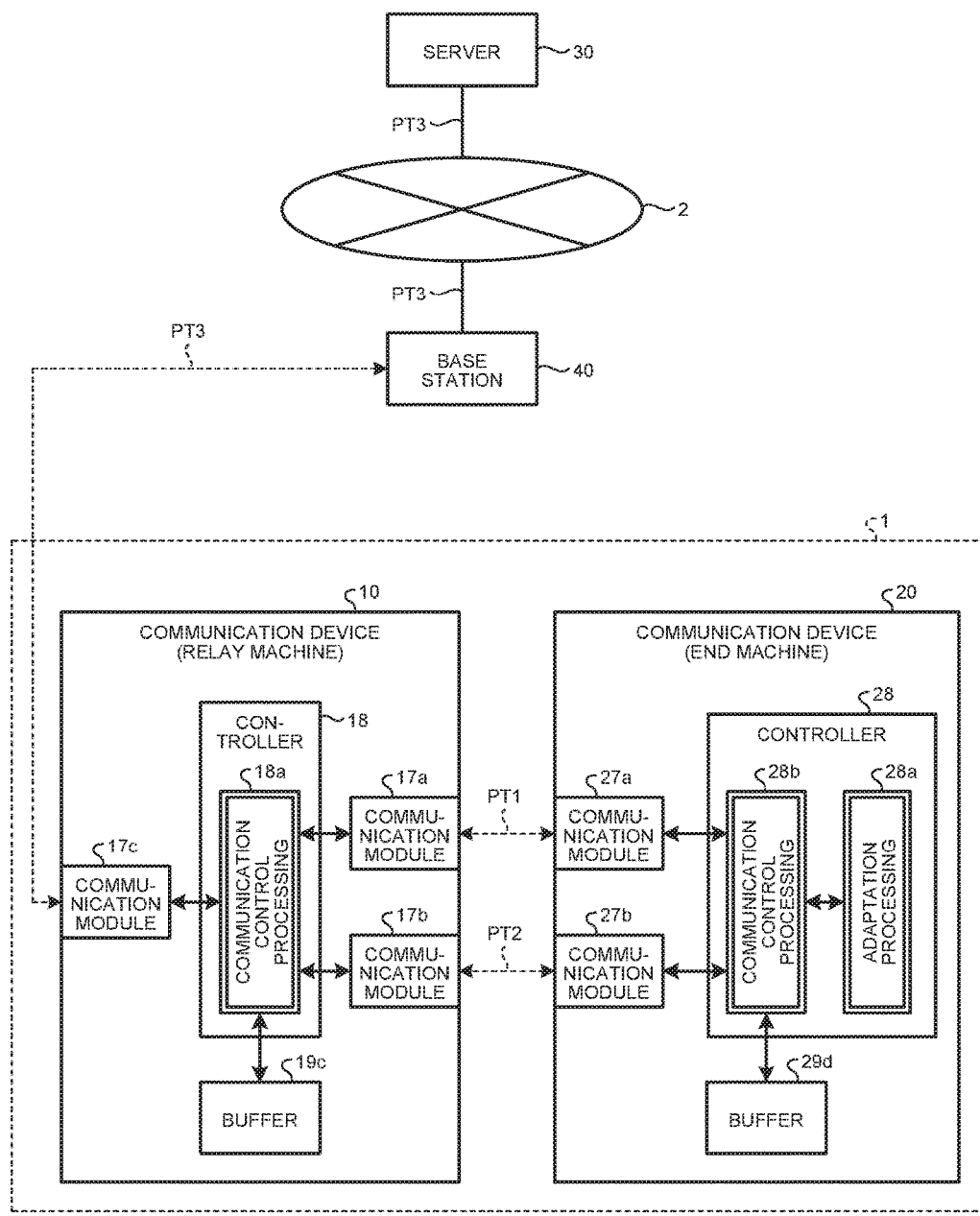
FIG. 1 is a diagram illustrating a configuration of a communication system according to an embodiment of some embodiments.

A configuration of a communication system 1 according to one of embodiments will be explained with reference to FIG. 1. FIG. 1 is a diagram illustrating a configuration of the communication system 1. As illustrated in FIG. 1, the communication system 1 includes a communication device 10 and a communication device 20. The communication device 10 functions as a relay machine for relaying communication between the communication device 20 and a public network 2. The communication device 20 functions as an end machine for performing various types of processing in cooperation with communications with a server 30 connected to the public network 2. The server 30 executes at least one of provision of information to the communication device 20 and reception of information transmitted from the communication device 20. The server 30 corresponds to, for example, a Web server, a mail server, a file server, and a database server; however, the server 30 is not limited thereto.

The communication between the communication device 10 and the communication device 20 is performed via a first path PT1 based on first communication or via a second path PT2 based on second communication. The second communication is communication based on a communication standard different from that of the first communication. The communication between the communication device 10 and the server 30 is performed via a third path PT3.

The first communication is, for example, wireless communication whose communication speed is relatively low (bandwidth is relatively narrow) and power consumption is relatively low. The first communication enables a first device and a second device to directly communicate with each other without a third device such as a base station 40. The first communication is represented by Bluetooth (registered trademark), and relay of communication based on the first communication is implemented, for example, by tethering using Bluetooth.

The second communication is, for example, wireless communication whose communication speed is relatively high (bandwidth is relatively wide) and power consumption is relatively high. Similarly to the first communication, the second communication enables the first device and the second device to directly communicate with each other without the third device such as the base station 40. The second communication is represented by Wi-Fi (registered trademark), and relay of communication based on the second communication is implemented, for example, by tethering using Wi-Fi.

The third path PT3 includes a path of wireless communication between the communication device 10 and the base station 40 and a path between the base station 40 and the server 30 via the public network 2. The base station 40 enables a communication device having a wireless communication function such as the communication device 10 to connect to the public network 2 and perform communication. The public network 2 may be a communication network provided by a single communication carrier or may be a communication network formed by mutually connecting communication networks of a plurality of communication carriers like the Internet. The public network 2 may be a wireless communication network, may be a wired communication network, or may be a combination thereof.

In this way, because of the configuration in which communication is performed via the communication device 10, the communication device 20 can communicate with the server 30 connected to the public network 2 even if the communication device 20 itself has no function for connecting to the public network 2 to perform communication. Alternatively, even if the communication device 20 has the function for connecting to the public network 2 to perform communication, it is possible to obtain advantageous effects such that communication costs for connecting to the public network 2 and performing communication can be aggregated in the communication device 10 and the communication function of the communication device 10 capable of performing communication at a higher speed can be utilized.

The communication device 10 includes a communication module 17a, a communication module 17b, a communication module 17c, a controller 18, and a buffer 19c. The communication module 17a communicates with the communication device 20 by using the first communication. The communication module 17b communicates with the communication device 20 by using the second communication. The communication module 17c enables the communication device 10 to connect to the public network 2 and communicate with other device. The controller 18 performs communication control processing 18a. The communication control processing 18a controls the communication module 17a, the communication module 17b, and the communication module 17c to implement a relay of communication between the communication device 20 and the server 30. The buffer 19c temporarily stores information (packet) transmitted from the server 30 to the communication device 20 so that the communication between the communication device 20 and the server 30 is continued even if the first path PT1 or the second path PT2 is temporarily disconnected.

The communication device 20 includes a communication module 27a, a communication module 27b, a controller 28, and a buffer 29d. The communication module 27a communicates with the communication device 10 by using the first communication. The communication module 27*b* communicates with the communication device 10 by using the second communication. The controller 28 performs adaptation processing 28*a* and communication control processing 28*b*. The adaptation processing 28*a* is processing performed in cooperation with the communication with the server 30. Examples of the adaptation processing 28*a* include, but are not limited to, browsing of WEB pages, transmission/reception of mails, streaming of video or music, download or upload of files, and data synchronization processing. The communication control processing 28*b* controls the communication module 27*a* and the communication module 27*b* to implement communication with the server 30 via the communication device 10. The buffer 29*d* temporarily stores information (packet) transmitted from the communication device 20 to the server 30 so that the communication between the communication device 20 and the server 30 is continued even if the first path PT1 or the second path PT2 is temporarily disconnected.

The communication control processing 18*a* and the communication control processing 28*b* control communications so that the adaptation processing 28*a* does not need to recognize whether the communication between the communication device 20 and the server 30 is performed via either the first path PT1 or the second path PT2. With the control, even if the communication is performed via the first path PT1 and even if the communication is performed via the second path PT2, the adaptation processing 28*a* can perform the processing in the same way.

Moreover, the communication control processing 18*a* and the communication control processing 28*b* control the communications so that a session between the communication device 20 and the server 30 is maintained without being reset even if the path used to perform communication is switched between the first path PT1 and the second path PT2. The case in which the path is switched between the first path PT1 and the second path PT2 includes a case in which the path is passively switched along with any failure and a case in which the communication device 10 or the communication device 20 spontaneously (actively) switches the path.

The session is a unit of communication in order to achieve a certain purpose. The session may be exchange of information for transmitting a single piece of information or exchange of information for transmitting a plurality of pieces of information. Examples of the session include, but are not limited to, exchange of information for downloading a plurality of files such as an HTML file and image data used to display one WEB page, exchange of a series of information for transmitting or receiving mail, and exchange of information for streaming of one video or music.

Figure 2:
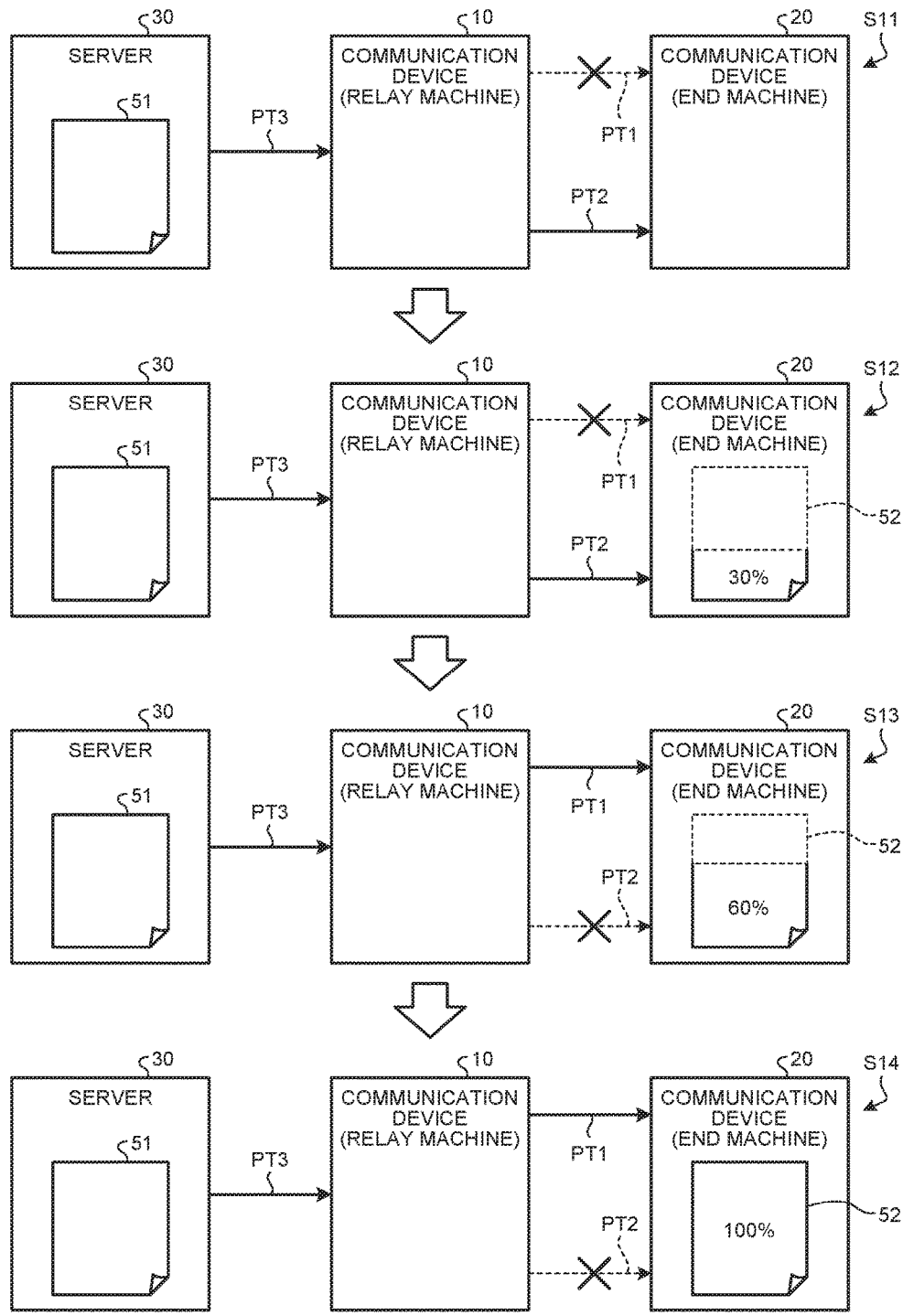
FIG. 2 is a diagram illustrating an example of switching a path between a first path and a second path while downloading a single file according to an embodiment of some embodiments.
Figure 3:
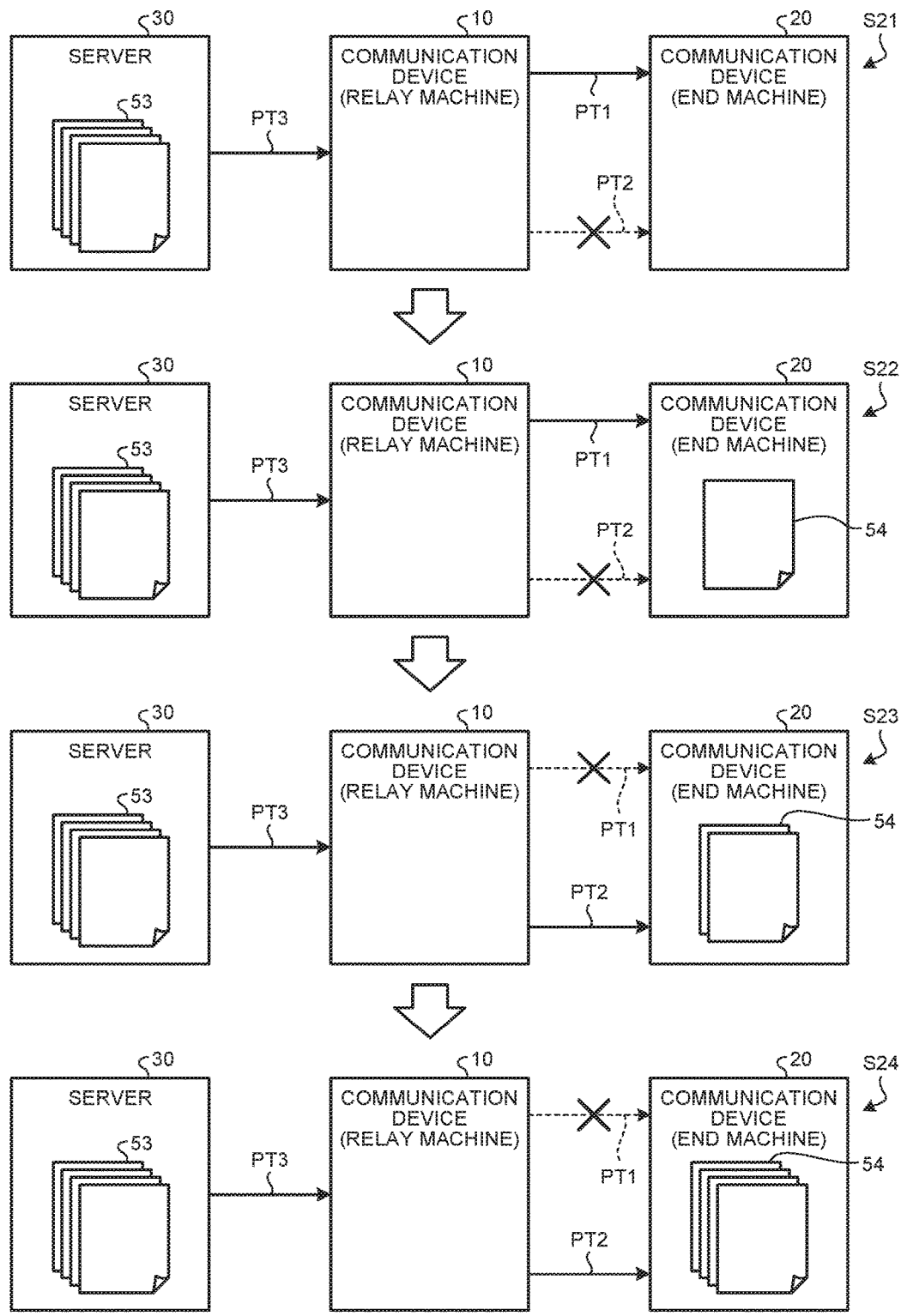
FIG. 3 is a diagram illustrating an example of switching a path between a first path and a second path while downloading a plurality of files according to an embodiment of some embodiments.

An example of switching the path between the first path PT1 and the second path PT2 while maintaining the session will be explained with reference to FIG. 2 and FIG. 3. FIG. 2 is a diagram illustrating an example of switching the path between the first path PT1 and the second path PT2 while downloading a single file. FIG. 3 is a diagram illustrating an example of switching the path between the first path PT1 and the second path PT2 while downloading a plurality of files.

At Step S11 illustrated in FIG. 2, the session of downloading a single file 51 stored in the server 30 to the communication device 20 is about to be started at the request of the communication device 20. The file 51 downloaded by the session between the communication device 20 and the server 30 (public network 2) is relayed by the communication device 10. The server 30 and the communication device 10 are connected to each other via the third path PT3, and the communication device 10 and the communication device 20 are connected to each other via the second path PT2.

At Step S12, the download of the file 51 is started in response to the request of the communication device 20, and 30% of the file 51 is stored as a file 52 in the communication device 20. It is assumed herein that the path used for the relay of the downloaded file 51 is switched between the first path PT1 and the second path PT2 for some reasons. In this case, the communication device 10 and the communication device 20 control the communications so that the session with the server 30 is maintained. Consequently, instead of downloading the file 51 again from 0% in response to the switching of the path, the rest of the download is continuously performed from the stage where 30% has been downloaded.

At Step S13, although the path used for the relay of the downloaded file 51 is switched from the second path PT2 to the first path PT1, the download is continued, and 60% of the file 51 is stored as the file 52 in the communication device 20. Then, at Step S14, the download is complete, and the whole of the file 51 is stored as the file 52 in the communication device 20.

At Step S21 illustrated in FIG. 3, the session of downloading a plurality of files 53 stored in the server 30 to the communication device 20 is about to be started at the request of the communication device 20. The files 53 downloaded by the session between the communication device 20 and the server 30 (communication network 2) are relayed by the communication device 10. The server 30 and the communication device 10 are connected to each other via the third path PT3, and the communication device 10 and the communication device 20 are connected to each other via the first path PT1.

At Step S22, the download of the files 53 is started in response to the request of the communication device 20, and one of the files 53 is stored as a file 54 in the communication device 20. It is assumed herein that the path used for the relay of the downloaded file 54 is switched between the first path PT1 and the second path PT2 for some reasons. In this case, the communication device 10 and the communication device 20 control the communications so that the session is maintained. Consequently, instead of downloading the files 53 again from the first one in response to the switching of the path, the rest of the download is continuously performed from the stage where one of them has been downloaded.

At Step S23, although the path used for the relay of the downloaded file 53 is switched from the first path PT1 to the second path PT2, the download is continued, and the second one of the files 53 is stored as the file 54 in the communication device 20. Then, at Step S24, the download is complete, and the whole of the files 53 is stored as the file 54 in the communication device 20.

In this way, by implementing the switching of the path between the first path PT1 and the second path PT2 while maintaining the session, it is possible to reduce the possibility that the time required for downloading is extended. Moreover, by performing the switching of the paths actively, it is possible to effectively use a characteristic of the first communication that the power consumption is low and a characteristic of the second communication that the communication speed is high depending on the situation.

Figure 4:
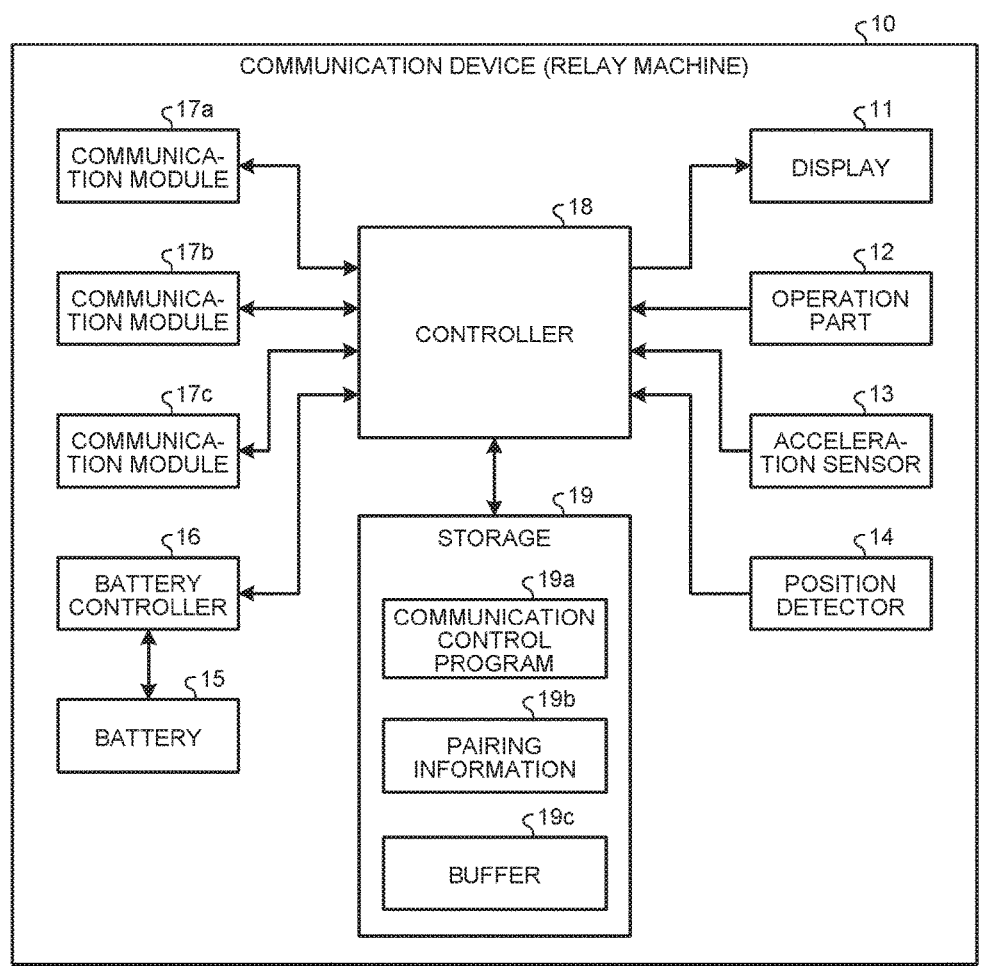
FIG. 4 is a block diagram of a communication device that functions as a relay machine according to an embodiment of some embodiments.

The configuration of the communication device 10 will be explained in more detail with reference to FIG. 4. FIG. 4 is a block diagram of the communication device 10 that functions as a relay machine. As illustrated in FIG. 4, the communication device 10 includes a display 11, an operation part 12, an acceleration sensor 13, a position detector 14, a battery 15, a battery controller 16, the communication module 17a, the communication module 17b, the communication module 17c, the controller 18, and a storage 19.

The display 11 displays information to the user. The display 11 has a display panel for displaying information. The operation part 12 receives an operation of the user. The operation part 12 includes an input device such as a button, a switch, and a touch sensor for receiving an operation. The acceleration sensor 13 detects a direction and magnitude of acceleration applied to the communication device 10.

The position detector 14 detects a current position. The position detector 14 may include a receiver of a positioning system using a satellite like a GPS receiver in order to detect a current position. The position detector 14 may detect the current position based on other communication devices such as the communication module 17a, the communication module 17b, or a base station detected by the communication module 17c.

The battery 15 supplies power to the modules of the communication device 10. The battery controller 16 controls the power supplied by the battery 15 according to the situation. Moreover, the battery controller 16 monitors a remaining amount of the battery 15 and notifies the controller 18 of the remaining amount.

The communication module 17a communicates with other communication device by using the first communication. The communication module 17b communicates with the other communication device by using the second communication. The communication module 17c enables the communication device 10 to connect to the public network 2 and communicate with other communication device. The communication method supported by the communication module 17c may be a communication method used for both data communication, or may be a communication method used for data communication. Examples of the communication method used for both the phone call and the data communication include, but are not limited to, LTE (Long Term Evolution), W-CDMA (Wideband Code Division Multiple Access), CDMA 2000, PDC (Personal Digital Cellular), GSM (registered trademark) (Global System for Mobile Communications), and PHS (Personal Handy-phone System). Examples of the communication method used for data communication include, but are not limited to, WiMAX (Worldwide Interoperability for Microwave Access) and IEEE 802.11.

The controller 18 is a processor. Examples of the processor include, but are not limited to, a CPU (Central Processing Unit), SoC (System-on-a-chip), an MCU (Micro Control Unit), and an FPGA (Field-Programmable Gate Array). The controller 18 integrally controls the operations of the communication device 10 to implement various functions.

Specifically, the controller 18 executes instructions included in the program stored in the storage 19 while referring to the data stored in the storage 19 as necessary. The controller 18 then controls a function module according to the data and the instructions and thereby implements the various functions. Examples of the function module include, but are not limited to, the display 11, the battery controller 16, the communication module 17a, the communication module 17b, and the communication module 17c. The controller 18 can change the control according to the detection result of a detector. Examples of the detector include, but are not limited to, the operation part 12, the acceleration sensor 13, the position detector 14, the battery controller 16, the communication module 17a, the communication module 17b, and the communication module 17c.

The storage 19 stores programs and data. The storage 19 is used also as a working area that temporarily stores a processing result of the controller 18. The storage 19 may include any non-transitory storage medium such as a semiconductor storage medium and a magnetic storage medium. Examples of the non-transitory storage medium include, but are not limited to, an optical disk such as CD (registered trademark), DVD (registered trademark), and Blu-ray (registered trademark), a magneto-optical disk, a magnetic storage medium, a memory card, and solid-state storage medium. The storage 19 may include a plurality of types of storage medium. The storage 19 may include a combination of a portable storage medium such as a memory card, an optical disk, or a magneto-optical disk with a reading device of the storage medium. The storage 19 may include a storage device used as a temporary storage area such as RAM (Random Access Memory).

The storage 19 stores a communication control program 19a and pairing information 19b, and includes the buffer 19c.

The communication control program 19a provides a function for implementing the communication control processing 18a illustrated in FIG. 1, i.e., a function of relaying communication performed by connecting to the public network 2 via the first communication performed by the communication module 17a or via the second communication performed by the communication module 17b. Specifically, the function provided by the communication control program 19a includes a function of authenticating a communication device that requests a relay to the communication device 10, a function of relaying a packet to be transmitted to the public network 2 side, a function of relaying a packet transmitted from the public network 2 side, and a function of switching communication used for the relay.

According to the function of authenticating the communication device that requests the relay to the communication device 10, it is checked whether the communication device that requests the relay to the communication device 10 is a device previously paired with the communication device 10. Whether the communication device is the previously paired device can be determined based on whether ID used for the communication by the device is registered in the pairing information 19b. The pairing is the processing of associating the device with a device in which execution of the communication is permitted, more specifically, the processing of registering ID etc. used for the communication in the other party's device. The ID mentioned here indicates, for example, MAC (Media Access Control Address Address) address and SSID (Service Set Identifier).

According to the function of relaying a packet to be transmitted to the public network 2 side, when receiving a first packet for relay in the communication module 17a or in the communication module 17b, a second packet is transmitted to a specified transmission destination from the communication module 17c. The second packet is a packet obtained by performing processing, such as rewriting of a header part such as an address portion and conversion of a format, on the first packet.

According to the function of relaying the packet transmitted from the public network 2 side, when receiving a third packet transmitted in response to the second packet in the communication module 17c, a fourth packet is transmitted to the communication device as a transmission source of the first packet. The fourth packet is a packet obtained by performing processing, such as rewriting of a header part such as an address portion and conversion of a format, on the third packet. The fourth packet is transmitted from a communication module, of the communication module 17a and the communication module 17b, used for the communication with the communication device as the transmission source of the first packet.

The communication module used for the communication with the communication device as the transmission source of the first packet is basically the same as the communication module that receives the first packet, but the communication module can be switched by the function of switching the communication used for the relay. The third packet is temporarily stored in the buffer 19c so that the third packet is not lost along with the switching of the communication used for the relay.

According to the function of switching the communication used for the relay, it is determined whether both the first communication and the second communication are available between the communication device 10 and the communication device that requests the relay to the communication device 10. Whether both the first communication and the second communication are available can be determined based on whether both the ID used for the first communication and the ID used for the second communication are registered in the pairing information 19b associated with the communication device that requests the relay to the communication device 10.

When both the first communication and the second communication are not available between the communication device 10 and the communication device that requests the relay to the communication device 10, the communication used for the relay cannot be switched. When both the first communication and the second communication are available between the communication device 10 and the communication device that requests the relay to the communication device 10, the communication used for the relay can be switched according to the situation. The switching is performed so that the ongoing session is maintained.

Specifically, the control is performed so that the switching is hidden from the server 30. For example, the rewriting of the header part of the packet to be relayed is performed based on an NAT (Network Address Translation) table or an NAPT (Network Address Port Translation), the rewriting is performed by using the same entry in the table before and after the switching of the communication. Thus, from the server 30, it looks as if the communication is performed with the same device before and after the switching of the communication, and therefore the session is not disconnected by the server 30 along with the switching of the communication.

When the switching is actively performed based on the determination of the communication device 10, prior to the execution of the switching, a switching notification for notifying that the switching is performed is transmitted through the communication used for the relay. With the notification, the switching can be performed in synchronization with the communication device that requests the relay to the communication device 10, and it is thereby possible to reduce the possibility of losing the information (packet) during relaying due to much time required for the switching.

The pairing information 19b stores information on the communication device paired with the communication device 10. FIG. 5 is a diagram illustrating an example of the pairing information 19b. In an example illustrated in FIG. 5, the pairing information 19b includes items such as Name, First ID, and Second ID. The item of Name stores a name for identifying a communication device. The item of First ID stores ID for identifying a communication device in the first communication. When the communication device does not support the first communication or when the communication device is not paired with the communication device 10 for the first communication, the item of First ID is blank. The item of Second ID stores ID for identifying a communication device in the second communication. When the communication device does not support the second communication or when the communication device is not paired with the communication device 10 for the second communication, the item of Second ID is blank.

In an example illustrated in FIG. 5, for the data in a first row, IDs are set to both the item of First ID and the item of Second ID, but for the data in a second row and a third row, ID is set only to either the item of First ID or the item of Second ID. This means that, when a relay is requested from the communication device corresponding to the data in the first row, it is possible to switch the communication used for the relay between the first communication and the second communication according to the situation but the switching cannot be implemented when the relay is requested from the communication device corresponding to the data in the second row or in the third row.

The format and the items of the pairing information 19b are not limited to an example of FIG. 5. For example, the pairing information 19b may be configured so that the information on the first communication and the information on the second communication are stored in separate files. In this case, the correspondence between the communication devices stored in the respective files should be recognizable. The pairing information 19b may include an item for storing other information required for communication such as a password and a corresponding profile.

Figure 6:
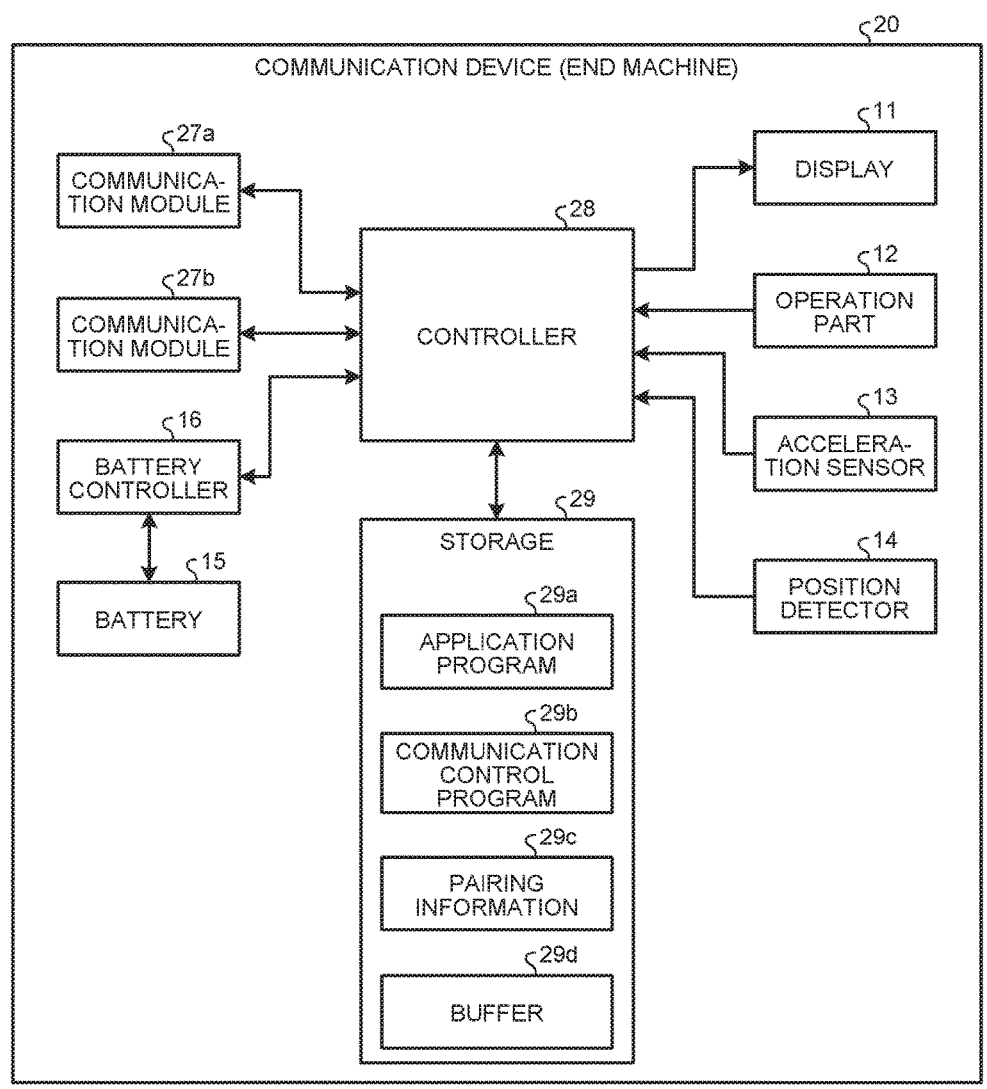
FIG. 6 is a block diagram of a communication device that functions as an end machine according to an embodiment of some embodiments.

The configuration of the communication device 20 will be explained in more detail with reference to FIG. 6. In the following, the same portions as these already explained are assigned with the same reference signs as these for the already explained portions, and overlapping explanation may be omitted. FIG. 6 is a block diagram of the communication device 20 that functions as an end machine. As illustrated in FIG. 6, the communication device 20 includes the display 11, the operation part 12, the acceleration sensor 13, the position detector 14, the battery 15, the battery controller 16, the communication module 27a, the communication module 27b, the controller 28, and a storage 29.

The communication module 27a communicates with other communication device by using the first communication. The communication module 27b communicates with the other communication device by using the second communication.

The controller 28 is a processor. The controller 28 integrally controls the operations of the communication device 20 to implement various functions.

Specifically, the controller 28 executes instructions included in the program stored in the storage 29 while referring to the data stored in the storage 29 as necessary. The controller 28 then controls a function module according to the data and the instructions and thereby implements the various functions. Examples of the function module include, but are not limited to, the display 11, the battery controller 16, the communication module 27a, and the communication module 27b. The controller 28 can change the control according to the detection result of a detector. Examples of the detector include, but are not limited to, the operation part 12, the acceleration sensor 13, the position detector 14, the battery controller 16, the communication module 27a, and the communication module 27b.

The storage 29 stores an application program 29a, a communication control program 29b, and pairing information 29c, and includes the buffer 29d.

The application program 29a provides a function for implementing the adaptation processing 28a illustrated in FIG. 1. The application program 29a corresponds to, for example, a browser program, a mail program, and a media reproduction program.

The communication control program 29b provides a function for implementing the communication control processing 28b illustrated in FIG. 1, i.e., a function of relaying communication performed by connecting to the public network 2 to the other device via the first communication performed by the communication module 27a or via the second communication performed by the communication module 27b. Specifically, the function provided by the communication control program 29b includes a function of authenticating a communication device that a relay is requested by the communication device 20, a function of transmitting a packet to the public network 2 side, a function of receiving a packet transmitted from the public network 2 side, and a function of switching communication used for the relay.

According to the function of authenticating the communication device that the relay is requested by the communication device 20, it is checked whether the communication device that the relay is about to be requested by the communication device 20 is a device previously paired with the communication device 20. Whether the communication device is the previously paired device can be determined based on whether ID used for the communication by the device is registered in the pairing information 29c.

According to the function of transmitting a packet to the public network 2 side, when the first packet to be transmitted is generated in the adaptation processing 28a, the second packet is transmitted to the communication device that the relay is requested by the communication device 20 via the communication module 27a or the communication module 27b. The second packet is a packet obtained by performing processing, such as rewriting of a header part such as an address portion and conversion of a format, on the first packet.

According to the function of receiving the packet transmitted from the public network 2 side, when receiving the third packet transmitted in response to the second packet in the communication module 27a or in the communication module 27b, the fourth packet is transmitted to the adaptation processing 28a. The fourth packet is a packet obtained by performing processing, such as rewriting of the header part such as an address portion and conversion of a format, on the third packet. The third packet is received by a communication module, of the communication module 27a and the communication module 27b, used for communication with the communication device that the relay is requested by the communication device 20.

The communication module used for communication with the communication device that the relay is requested by the communication device 20 is basically the same as the communication module that transmits the second packet, but the communication module can be switched by the function of switching the communication used for the relay. The first packet is temporarily stored in the buffer 29d so that the first packet is not lost along with the switching of the communication used for the relay.

According to the function of switching the communication used for the relay, it is determined whether both the first communication and the second communication are available between the communication device 20 and the communication device that the relay is requested by the communication device 20. Whether both the first communication and the second communication are available can be determined based on whether both the ID used for the first communication and the ID used for the second communication are registered in the pairing information 29c associated with the communication device that the relay is requested by the communication device 20.

When both the first communication and the second communication are not available between the communication device 20 and the communication device that the relay is requested by the communication device 20, the communication used for the relay is not switched. When both the first communication and the second communication are available between the communication device 20 and the communication device that the relay is requested by the communication device 20, the communication used for the relay is switched according to the situation. The switching is performed so that the ongoing session is maintained.

Specifically, the control is performed so that the switching is hidden from the adaptation processing 28a. For example, from which of the communication module 27a and the communication module 27b the packet to be transmitted to the public network 2 side should be transmitted is determined not in the adaptation processing 28a but in the communication control processing 28b. For example, the packet transmitted from the public network 2 side is transmitted to the adaptation processing 28a so that it is not known which of the communication module 27a and the communication module 27b receives the packet. Thus, from the adaptation processing 28a, it looks as if the communication is performed using the same path before and after the switching of the communication, and therefore the session is not disconnected by the adaptation processing 28a along with the switching of the communication.

When the switching is actively performed based on the determination of the communication device 20, prior to the execution of the switching, a switching notification for notifying that the switching is performed is transmitted through the communication used for the relay. With the notification, the switching can be performed in synchronization with the communication device that the relay is requested by the communication device 20, and it is thereby possible to reduce the possibility of losing the information (packet) during relaying due to much time required for the switching.

Figures 7, 8:
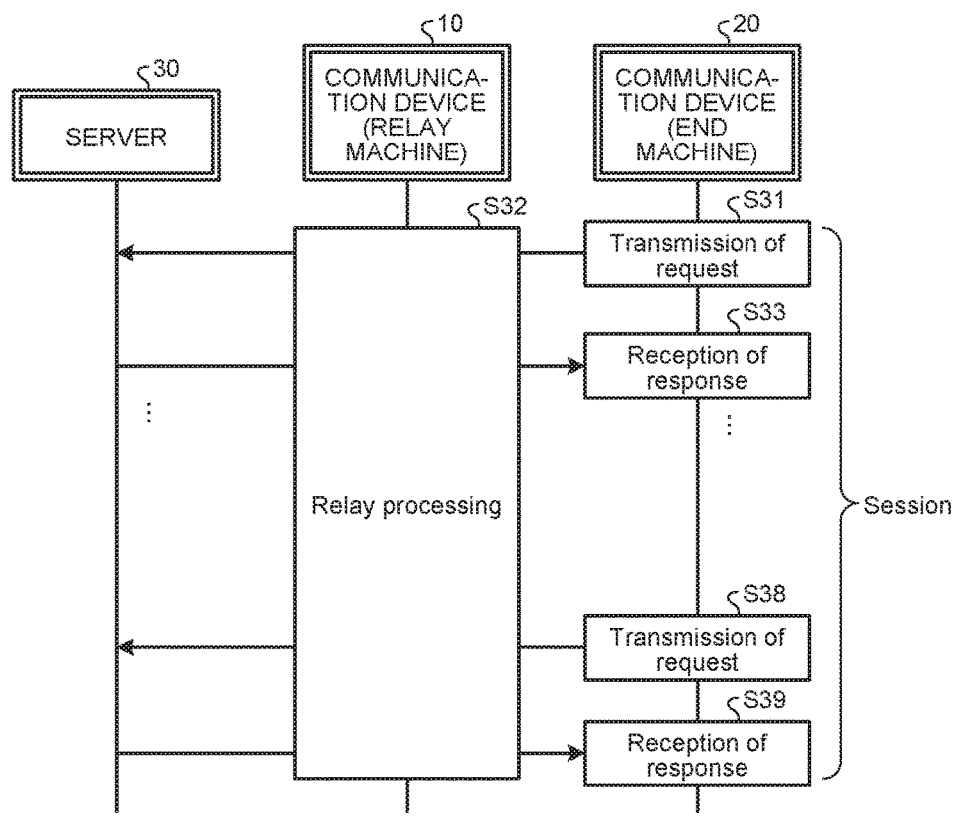
FIG. 7 is a diagram illustrating an example of pairing information according to an embodiment of some embodiments.
FIG. 8 is a sequence diagram illustrating an example of operations of a communication system according to an embodiment of some embodiments.

The pairing information 29c stores information on the communication device paired with the communication device 20. FIG. 7 is a diagram illustrating an example of the pairing information 29c. In an example illustrated in FIG. 7, the pairing information 29c includes items such as Name, First ID, and Second ID. The item of Name stores a name for identifying a communication device. The item of First ID stores ID for identifying a communication device in the first communication. When the communication device does not support the first communication or when the communication device is not paired with the communication device 20 for the first communication, the item of First ID is blank. The item of Second ID stores ID for identifying a communication device in the second communication. When the communication device does not support the second communication or when the communication device is not paired with the communication device 20 for the second communication, the item of Second ID is blank.

In an example illustrated in FIG. 7, for the data in a first row, IDs are set to both the item of First ID and the item of Second ID, but for the data in a second row and a third row, ID is set only to either the item of First ID or the item of Second ID. This means that, when a relay is requested to the communication device corresponding to the data in the first row, it is possible to switch the communication used for the relay between the first communication and the second communication according to the situation but the switching cannot be implemented when the relay is requested to the communication device corresponding to the data in the second row or in the third row.

The format and the items of the pairing information 29c are not limited to an example of FIG. 7. For example, the pairing information 29c may be configured so that the information on the first communication and the information on the second communication are stored in separate files. In this case, the correspondence between the communication devices stored in the respective files should be recognizable. The pairing information 29c may include an item for storing other information required for communication such as a password and a corresponding profile.

Figure 9:
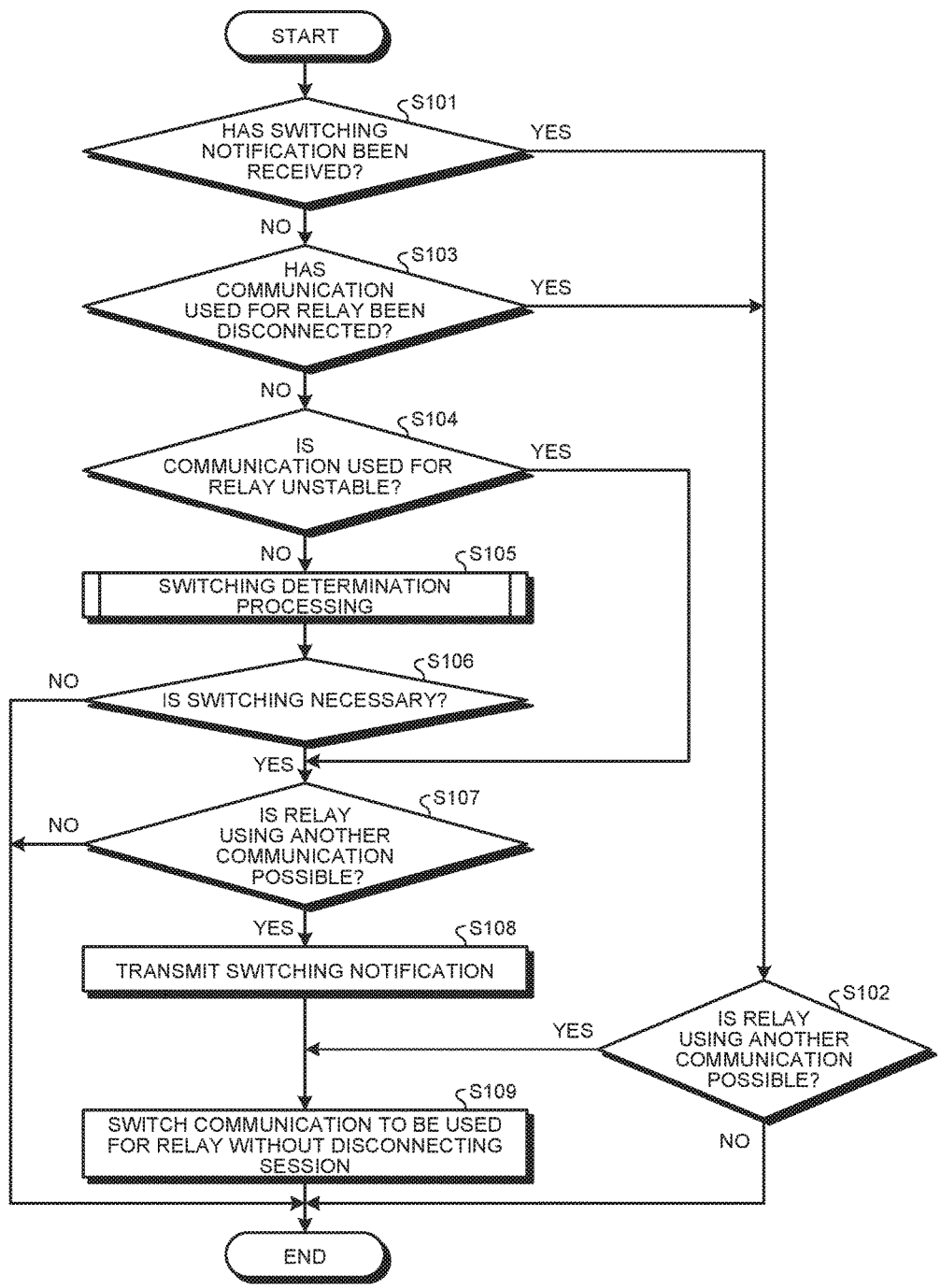
FIG. 9 is a flowchart illustrating an example of switching processing for switching communication used for relay according to an embodiment of some embodiments.
Figure 10:
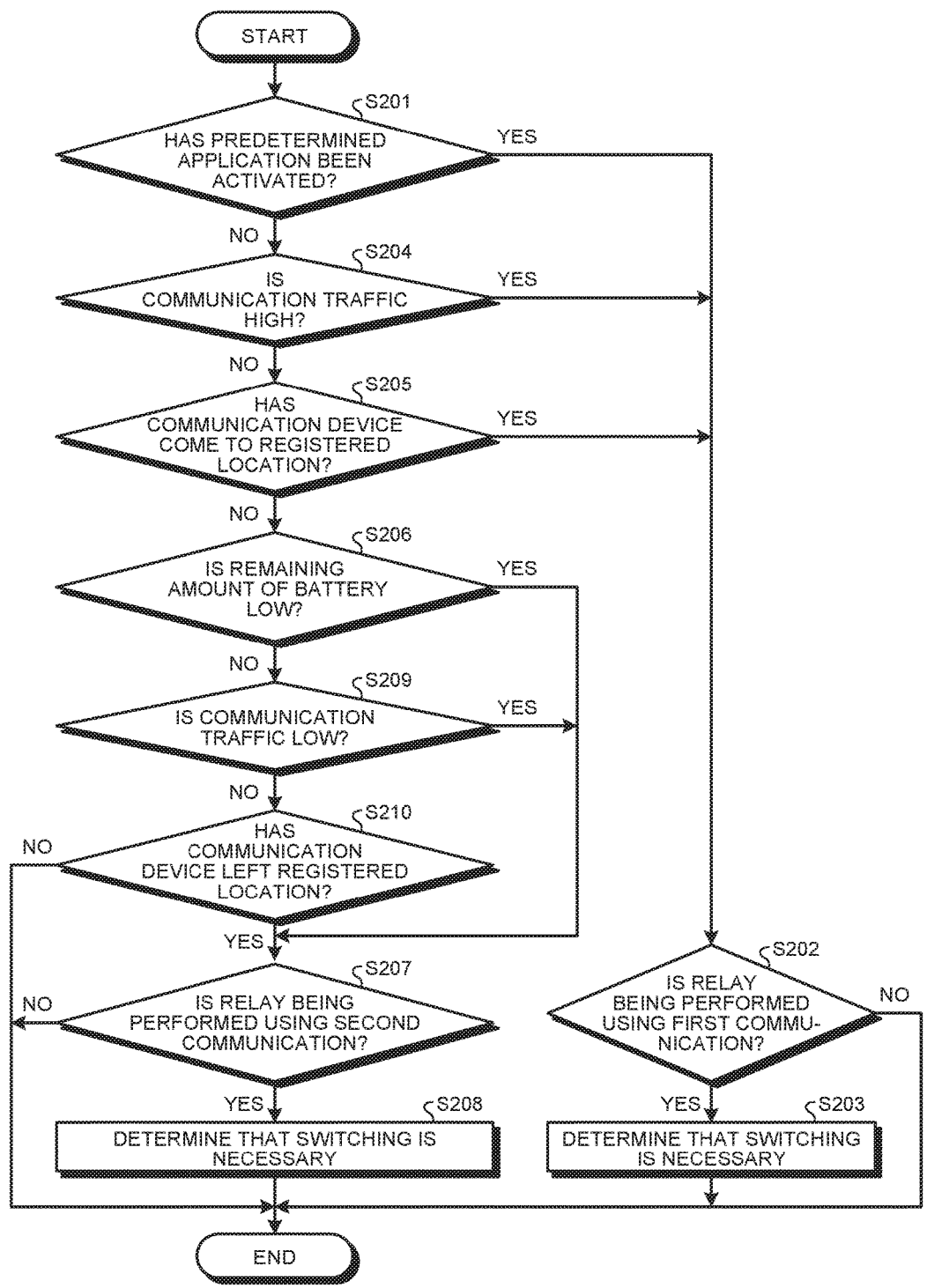
FIG. 10 is a flowchart illustrating an example of switching determination processing for determining whether to switch communication used for relay according to an embodiment of some embodiments.

The operations of the communication system 1 will be explained in more detail below with reference to FIG. 8 to FIG. 10. FIG. 8 is a sequence diagram illustrating an example of the operations of the communication system 1. FIG. 9 is a flowchart illustrating an example of switching processing for switching communication used for a relay. FIG. 10 is a flowchart illustrating an example of switching determination processing for determining whether to switch communication used for the relay.

As illustrated in FIG. 8, at Step S31, data communication is started from transmission of a packet including a request by the communication device 20. The packet is transmitted to the server 30 by the communication processing performed by the communication device 10 at Step S32. The communication processing performed by the communication device 10 is executed until the downloading is finished by the session. The server 30 performs the processing responding to the request and transmits the packet including a response corresponding to the request. The packet is relayed by the communication device 10, and received by the communication device 20 at Step S33.

In this way, the transmission of the request and the reception of the response are repeated, then at Step S38, the packet including a last request is transmitted from the communication device 20, and, at Step S39, when the packet including the response is received by the communication device 20, the data communication is complete.

In the session, the communication used for the relay of the communication data is switched according to the situation between the communication device 10 and the communication device 20. The switching of the communication is performed by the switching processing illustrated in FIG. 9. The controller 18 of the communication device 10 repeatedly performs the switching processing illustrated in FIG. 9 based on the communication control program 19a while the communication device 10 is requested to relay the communication from the other communication device. The controller 28 of the communication device 20 repeatedly performs the switching processing illustrated in FIG. 9 based on the communication control program 29b while the communication device 20 requests the other communication device to relay communication. Because frequent switching of the communication is not preferable in some cases, the switching processing may be repeated with a predetermined interval.

The switching processing illustrated in FIG. 9 may be performed only one of the communication device 10 or the communication device 20. The switching processing and the switching determination processing will be explained below using the case where the processing is executed by the communication device 10 as an example.

At Step S101, the controller 18 determines whether the switching notification has been received from the other party's device of the relay. When the switching notification has been received (Yes at Step S101), the controller 18 proceeds to Step S102. At Step S102, the controller 18 determines whether the relay can be performed by using the other communication different from the communication currently used for the relay between the communication device 10 and the other party's device of the relay. In other words, the controller 18 determines whether the relay can be preformed by using both the first communication and the second communication between the communication device 10 and the other party's device of the relay.

When the relay can be performed by using the other communication (Yes at Step S102), the controller 18 proceeds to Step S109. At Step S109, the controller 18 switches the communication used for the relay without disconnecting the session. For example, when the relay is performed by using the first communication, the communication used for the relay is switched to the second communication. When the relay is performed by using the second communication, the communication used for the relay is switched to the first communication. When the relay cannot be performed by using the other communication (No at Step S102), Step S109 is not performed.

When the communication used for the relay is to be switched, it is preferable that a communication module corresponding to the communication not used for relay is stopped by the switching or the mode is shifted to a mode in which power consumption is low. Therefore, it is possible to suppress (reduce) an increase in the power consumption caused by the communication device having a plurality of communication modules.

When the switching notification has not been received at Step S101 (No at Step S101), the controller 18 proceeds to Step S103. At Step S103, the controller 18 determines whether the communication used for the relay has been disconnected for some reason. When the communication used for the relay has been disconnected (Yes at Step S103), the controller 18 performs the processing at Step S102 and subsequent steps which are already explained. When the communication used for the relay has not been disconnected (No at Step S103), the controller 18 proceeds to Step S104.

At Step S104, the controller 18 determines whether the communication used for the relay is unstable. Whether the communication is unstable is determined based on, for example, the intensity of electric waves, the quality of electric waves, and the level of an error rate. When the communication used for the relay is unstable (Yes at Step S104), the controller 18 proceeds to Step S107. At Step S107, the controller 18 determines whether the relay can be performed by using the other communication different from the communication currently used for the relay between the own device and the other party's device of the relay. In other words, the controller 18 determines whether the relay can be preformed by using both the first communication and the second communication between the own device and the other party's device of the relay.

When the relay can be performed by using the other communication (Yes at Step S107), the controller 18 proceeds to Step S108. At Step S108, the controller 18 transmits the switching notification to the other party's device of the relay via the communication currently used for the relay.

Thereafter, the controller 18 performs the processing at Step S109 which is already explained. When the relay cannot be performed by using the other communication (No at Step S107), Step S108 and Step S109 are not performed.

When the communication used for the relay is not unstable at Step S104 (No at Step S104), the controller 18 proceeds to Step S105. At Step S105, the controller 18 performs switching determination processing explained later. In the switching determination processing, it is determined whether the communication should be actively switched. When it is determined that the switching is necessary (Yes at Step S106), the controller 18 performs the processing at Step S107 and subsequent steps which are already explained. When it is determined that the switching is not necessary (No at Step S106), the controller 18 does not perform the processing at Step S107 and subsequent steps.

As illustrated in FIG. 10, in the switching determination processing, the controller 18 determines whether a predetermined application program has been activated in the communication device 20 at Step S201. The predetermined application program is, for example, a program for executing processing of transmitting/receiving a large amount of information or a program for executing processing that needs to send and receive information at a high speed.

When the switching determination processing is executed in the communication device 10, it can be determined whether the predetermined application program has been activated in the communication device 20, for example, by analyzing the packet received from the communication device 20. More specifically, when the packet received from the communication device 20 is an IP packet or a packet obtained by converting the IP packet, it is possible to determine what kind of program is executed in the communication device 20 by referring to the value of a port number.

When the predetermined application program has been activated in the communication device 20 (Yes at Step S201), the controller 18 proceeds to Step S202. At Step S202, the controller 18 determines whether the relay is being performed by using the first communication. In an embodiment, the first communication is communication with relatively low communication speed.

When the relay is being performed by using the first communication (Yes at Step S202), the controller 18 proceeds to Step S203. At Step S203, the controller 18 determines that switching of the communication used for the relay is necessary. That is, the controller 18 determines that the relay should be performed by using the communication that can be performed at higher speed. When the relay is not performed by using the first communication (No at Step S202), it is determined that the switching is not necessary.

When the predetermined application program has not been activated in the communication device 20 (No at Step S201), the controller 18 proceeds to Step S204. At Step S204, the controller 18 determines whether communication traffic of the relay is high. Whether the communication traffic of the relay is high is determined by using, for example, a threshold. When the communication traffic of the relay is high (Yes at Step S204), the controller 18 performs the processing at Step S202 and subsequent steps which are already explained. Thus, it is possible to increase a possibility that the relay is performed using the communication suitable for transmitting and receiving a large amount of information.

When the communication traffic of the relay is not high (No at Step S204), the controller 18 proceeds to Step S205. At Step S205, the controller 18 determines whether the communication device 10 has entered a predetermined range from a previously registered location. The previously registered location is a location where a higher speed communication means can be used in order that the communication device 10 connects to the public network 2. For example, a home or a worksite which has an access point of wireless communication connected to an optical line is previously registered. In this case, the predetermined range from the previously registered location is a range where the access point can be used. Whether the communication device 10 has entered the predetermined range from the previously registered location can be determined by using, for example, the position detector 14.

When the communication device 10 has entered the predetermined range from the previously registered location (Yes at Step S205), the controller 18 performs the processing at Step S202 and subsequent steps which are already explained. Thus, it is possible to increase a possibility that the relay can be also performed at a high speed responding to high speed communication with the public network 2.

When the communication device 10 has not entered the predetermined range from the previously registered location (No at Step S205), the controller 18 proceeds to Step S206. At Step S206, the controller 18 determines whether the remaining amount of the battery 15 is low. Whether the remaining amount of the battery 15 is low is determined, for example, by comparing the value notified from the battery controller 16 and the threshold. When the remaining amount of the battery 15 is low (Yes at Step S206), the controller 18 proceeds to Step S207.

At Step S207, the controller 18 determines whether the relay is being performed by using the second communication. In an embodiment, the second communication is communication with relatively high power consumption.

When the relay is being performed by using the second communication (Yes at Step S207), the controller 18 proceeds to Step S208. At Step S208, the controller 18 determines that the switching of the communication used for relay is necessary. In other words, the controller 18 determines that the relay should be performed by using the communication with lower power consumption. When the relay is not performed by using the second communication (No at Step S207), it is determined that the switching is not necessary.

When the remaining amount of the battery 15 is not low (No at Step S206), the controller 18 proceeds to Step S209. At Step S209, the controller 18 determines whether communication traffic of the relay is low. Whether the communication traffic of the relay is low is determined by using, for example, a threshold. The threshold for determining whether the communication traffic of the relay is low may be the same as the threshold for determining whether the communication traffic of the relay is high, or may be a threshold that is set to be lower than the threshold for determining whether the communication traffic of the relay is high. When the communication traffic of the relay is low (Yes at Step S209), the controller 18 performs the processing at Step S207 and subsequent steps which are already explained. Thus, it is possible to increase a possibility that the power consumption can be saved according to the required communication traffic.

When the communication traffic of the relay is not low (No at Step S209), the controller 18 proceeds to Step S210. At Step S210, the controller 18 determines whether the communication device 10 has exited the predetermined range from the previously registered location. The previously registered location is a location, as already explained, where a higher speed communication means can be used in order that the communication device 10 connects to the public network 2.

When the communication device 10 has exited the predetermined range from the previously registered location (Yes at Step S210), the controller 18 performs the processing at Step S207 and subsequent steps which are already explained. Thus, it is possible to increase a possibility that the power consumption can be saved according to a case in which the high speed communication with the public network 2 is disabled. When the communication device 10 has not exited the predetermined range from the previously registered location (No at Step S210), it is determined that the switching is not necessary.

Some embodiments disclosed in the present disclosure can be modified within a scope that does not depart from the gist and the scope of the disclosure. Moreover, some embodiments and modifications thereof disclosed in the present disclosure can be combined with each other if necessary. For example, some embodiments may be modified as follows.

For example, the programs illustrated in FIG. 4 and FIG. 6 may be divided into a plurality of modules, or may be combined with any other program.

In some embodiments, as an example of the first communication and the second communication, namely, of communication capable of directly communicating with the other device, Bluetooth and WiFi have been explained; however, the first communication and the second communication are not limited thereto. The first communication and the second communication may be other short-distance communication capable of directly communicating other device. Examples of the short-distance communication include, but are not limited to, visible light communication, infrared communication, and ZigBee. The condition to switch the communication used for the relay between the first communication and the second communication may be changed according to each characteristic of a communication standard applied to the first communication and of a communication standard applied to the second communication.

The communication device 10 and the communication device 20 may be configured so as to switch among communications of three or more of communication standards and use it for relay.

The condition to switch the communication used for the relay between the first communication and the second communication is not limited to an example. For example, when an AP at home cannot be used, and if a communication device has a function of stopping Wi-Fi in response to detection of a move by an acceleration sensor in order to automatically stop Wi-Fi, this function is enabled. Therefore, it may be configured to switch the communication used for relay from Wi-Fi to the other communication before Wi-Fi is stopped when the move is detected by the acceleration sensor.

Some embodiments have explained an example in which the communication device 10 functions as the relay machine and the communication device 20 functions as the end machine; however, the communication device 10 and the communication device 20 may be configured so as to function as either the relay machine or the end machine according to settings.

The communication device 10 and the communication device 20 may be such that both of them are mobile communication devices or such that one of them is a mobile communication device and the other one is a stationary type communication device. Examples of the mobile communication device include, but are not limited to, smartphones, mobile phones, tablets, mobile personal computers, digital cameras, media players, electronic book readers, navigators, and gaming devices. The communication device 10 may be a mobile router. Examples of the stationary type communication device include, but are not limited to, desktop personal computers, automated teller machines (ATM), and TV receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A communication device, comprising:
 a first communication module configured to directly communicate with another device using first communication;
 a second communication module configured to directly communicate with the another device using second communication that is different from the first communication in a standard;
 a third communication module configured to connect to a public network and perform a communication session with the public network; and
 a controller configured to, based on a request from the another device, relay communication data, which is obtained from the public network during the communication session with the public network, to the another device using the first communication or the second communication, wherein
 the controller is configured to, while maintaining the communication session with the public network performed by the third communication module, switch between
  relaying the communication data, which is obtained from the public network during the communication session with the public network, to the another device using the first communication, and
  relaying the communication data, which is obtained from the public network during the communication session with the public network, to the another device using the second communication.

2. The communication device according to claim 1, wherein the controller is configured to, according to a situation, actively switch between
 said relaying the communication data, which is obtained from the public network during the communication session with the public network, to the another device using the first communication, and
 said relaying the communication data, which is obtained from the public network during the communication session with the public network, to the another device using the second communication.

3. A communication device, comprising:
 a fourth communication module configured to directly communicate with another device using first communication, the another device being configured to connect to a public network and perform a communication session with the public network;
 a fifth communication module configured to directly communicate with the another device using second communication that is different from the first communication in a standard; and a controller configured to, based on a request of the communication device, relay communication data, which is obtained from the public network during the communication session performed by the another device, using the first communication or the second communication, wherein the controller is configured to, while causing the another device to maintain the communication session with the public network, switch between relaying the communication data, which is obtained by the another device from the public network during the communication session with the public network, from the another device using the first communication, and relaying the communication data, which is obtained by the another device from the public network during the communication session with the public network, from the another device using the second communication.

4. A communication system comprising:

a first communication device configured to be communicable with a public network; and a second communication device configured to be communicable with the first communication device, wherein the first communication device includes:

a first communication module configured to directly communicate with the second communication device using first communication;

a second communication module configured to directly communicate with the second communication device using second communication that is different from the first communication in a standard; and a third communication module configured to connect to the public network and perform a communication session with the public network, the second communication device includes:

a fourth communication module configured to directly communicate with the first communication module of the first communication device using the first communication; and a fifth communication module configured to directly communicate with the second communication module of the first communication device using the second communication, and the first communication device is configured to based on a request from the second communication device, relay communication data, which is obtained from the public network during the communication session with the public network, to the second communication device using the first communication or the second communication, and while maintaining the communication session with the public network performed by the third communication module, switch between relaying the communication data, which is obtained from the public network during the communication session with the public network, to the second communication device using the first communication, and relaying the communication data, which is obtained from the public network during the communication session with the public network, to the second communication device using the second communication.

5. A communication control method implemented by a first communication device configured to be communicable with a public network and a second communication device configured to be directly communicable with the first communication device over first communication and second communication, the communication control method comprising:

connecting, by the first communication device, to the public network and performing a communication session with the public network;

relaying, by the first communication device, communication data, which is obtained from the public network during the communication session with the public network based on a request from the second communication device, to the second communication device using the first communication or the second communication that is different from the first communication in a standard; and switching, by the first communication device while causing the first communication device to maintain the communication session with the public network, between relaying, by the first communication device, the communication data, which is obtained from the public network during the communication session with the public network, to the second communication device using the first communication, and relaying, by the first communication device, the communication data, which is obtained from the public network during the communication session with the public network, to the second communication device using the second communication.

6. A computer program product having computer instructions stored on a non-transitory computer readable storage medium, for causing a communication device executing the computer instructions to perform operations, the communication device including:

a first communication module configured to directly communicate with another device using first communication;

a second communication module configured to directly communicate with the another device using second communication that is different from the first communication in a standard; and a third communication module configured to connect to a public network and perform a communication session with the public network, the operations comprising:

relaying communication data, which is obtained from the public network during the communication session with the public network based on a request from the another device, to the another device using the first communication or the second communication; and switching, while maintaining the communication session with the public network performed by the third communication module, between relaying the communication data, which is obtained from the public network during the communication session with the public network, to the another device using the first communication, and relaying the communication data, which is obtained from the public network during the communication session with the public network, to the another device using the second communication.

* * * * *